United States Patent
Peltier et al.

(10) Patent No.: US 11,444,907 B2
(45) Date of Patent: Sep. 13, 2022

(54) SYSTEM AND METHOD FOR DETERMINING SENTIMENT AND/ OR SEMANTICS OF RESPONSES IN A ONE-TO-MANY MESSAGING PLATFORM

(71) Applicant: Community.com, Inc., Santa Monica, CA (US)

(72) Inventors: Matthew Peltier, Los Angeles, CA (US); Joshua Rosenheck, Los Angeles, CA (US); Noah Heller, Santa Monica, CA (US); Lars Perkins, Camden, ME (US); Barry Steinglass, Seattle, WA (US); Tomas Koci, Venice, CA (US); Alec Rubin, Venice, CA (US)

(73) Assignee: Community.com, Inc., Santa Monica, CA (US)

( * ) Notice: Subject to any disclaimer, the term of this patent is extended or adjusted under 35 U.S.C. 154(b) by 0 days.

(21) Appl. No.: 16/780,885

(22) Filed: Feb. 3, 2020

(65) Prior Publication Data

US 2020/0252355 A1 Aug. 6, 2020

Related U.S. Application Data

(60) Provisional application No. 62/800,403, filed on Feb. 1, 2019.

(51) Int. Cl.
*H04L 51/226* (2022.01)
*G06N 20/00* (2019.01)
(Continued)

(52) U.S. Cl.
CPC .......... *H04L 51/226* (2022.05); *G06F 16/316* (2019.01); *G06F 16/908* (2019.01);
(Continued)

(58) Field of Classification Search
CPC ....... H04L 51/26; H04L 51/046; H04L 51/12; H04L 51/16; H04L 51/063; H04L 51/34;
(Continued)

(56) References Cited

U.S. PATENT DOCUMENTS 9,325,849 B1 4/2016 Brydon et al.
9,654,640 B1 5/2017 Brydon et al.
(Continued)

FOREIGN PATENT DOCUMENTS

EP 1953723 A2 8/2008
WO 2018232033 A1 12/2018

OTHER PUBLICATIONS

U.S. Appl. No. 16/780,878, Non-Final Office Action, dated Dec. 8, 2020, 15 pages.
(Continued)

*Primary Examiner* — Caroline H Jahnige
(74) *Attorney, Agent, or Firm* — Morrison & Foerster LLP (57) ABSTRACT

A messaging system includes a messaging platform having one or more interfaces for communicating with one or more messaging services, the one or more messaging services transmitting client text messages associated with the client, and receiving user text messages from individual ones of the plurality of users. The messaging system further includes a machine learning module that executes one or more artificial intelligence algorithms, the machine learning module being configured to receive the user text messages, process the user text messages according to the one or more artificial intelligence algorithms and, based on one or more of variables associated with the user text messages, generate metadata for each of the user text messages, the metadata representing one or more attributes associated with content
(Continued)

of each of the plurality of user text messages or a user associated with the user text messages.

18 Claims, 9 Drawing Sheets

(51) Int. Cl.

| | |
|---|---|
| *G06F 16/908* | (2019.01) |
| *G06F 16/31* | (2019.01) |
| *G06F 40/30* | (2020.01) |
| *G06Q 10/10* | (2012.01) |
| *H04W 4/06* | (2009.01) |
| *H04W 4/12* | (2009.01) |
| *G06F 40/295* | (2020.01) |
| *H04L 51/046* | (2022.01) |
| *G06F 40/216* | (2020.01) |
| *H04L 51/063* | (2022.01) |
| *H04L 51/56* | (2022.01) |
| *H04L 51/212* | (2022.01) |
| *H04L 51/216* | (2022.01) |
| *H04L 51/234* | (2022.01) |

(52) U.S. Cl.
CPC .......... *G06F 40/216* (2020.01); *G06F 40/295* (2020.01); *G06F 40/30* (2020.01); *G06N 20/00* (2019.01); *G06Q 10/107* (2013.01); *H04L 51/046* (2013.01); *H04L 51/063* (2013.01); *H04L 51/212* (2022.05); *H04L 51/216* (2022.05); *H04L 51/234* (2022.05); *H04L 51/56* (2022.05); *H04W 4/06* (2013.01); *H04W 4/12* (2013.01)

(58) Field of Classification Search
CPC ......... H04L 51/36; H04L 51/30; H04L 51/14; H04L 12/1886; H04L 12/1881; H04L 12/189; H04L 63/08; H04L 51/04; H04L 51/226; H04L 51/216; H04L 51/214; G06F 16/316; G06F 40/30; G06F 40/295; G06F 40/216; G06F 16/908; G06Q 10/107; H04W 4/06; H04W 4/12; H04W 4/02; H04W 4/029; H04W 4/14; G06N 20/00

See application file for complete search history.

(56) References Cited

U.S. PATENT DOCUMENTS

| | | | | |
|---|---|---|---|---|
| 9,965,443 | B2* | 5/2018 | Eggink | G06F 40/10 |
| 10,251,115 | B2* | 4/2019 | Cogion | H04W 4/16 |
| 10,425,783 | B1 | 9/2019 | Caldwell et al. | |
| 10,785,185 | B2 | 9/2020 | Vennam et al. | |
| 2002/0077130 | A1 | 6/2002 | Owensby | |
| 2002/0159575 | A1 | 10/2002 | Skladman et al. | |
| 2008/0086534 | A1 | 4/2008 | Bardak et al. | |
| 2009/0006565 | A1 | 1/2009 | Hughts, Jr. et al. | |
| 2010/0125491 | A1 | 5/2010 | Elliott et al. | |
| 2010/0223341 | A1 | 9/2010 | Manolescu et al. | |
| 2012/0271884 | A1 | 10/2012 | Holmes et al. | |
| 2013/0086188 | A1 | 4/2013 | Mays et al. | |
| 2014/0087697 | A1 | 3/2014 | Johnston et al. | |
| 2014/0237057 | A1 | 8/2014 | Khodorenko | |
| 2014/0379814 | A1 | 12/2014 | Graff et al. | |
| 2014/0379818 | A1 | 12/2014 | Cudak et al. | |
| 2015/0120357 | A1 | 4/2015 | Tuchman et al. | |
| 2015/0149561 | A1* | 5/2015 | Bell | H04L 51/04 709/206 |
| 2015/0269697 | A1 | 9/2015 | Rivera de la Vega et al. | |
| 2015/0281156 | A1* | 10/2015 | Beausoleil | H04L 51/12 709/206 |
| 2015/0312733 | A1* | 10/2015 | Beans | H04L 51/063 455/466 |
| 2015/0341300 | A1 | 11/2015 | Swain et al. | |
| 2016/0182412 | A1 | 6/2016 | Kabbes et al. | |
| 2016/0344581 | A9 | 11/2016 | Karmarkar | |
| 2017/0142036 | A1 | 5/2017 | Li et al. | |
| 2017/0180298 | A1 | 6/2017 | Arbajian et al. | |
| 2017/0270099 | A1* | 9/2017 | Gorny | G06Q 30/01 |
| 2018/0114242 | A1 | 4/2018 | Lopez et al. | |
| 2019/0019204 | A1* | 1/2019 | Kopikare | H04L 51/046 |
| 2019/0028858 | A1* | 1/2019 | Johnston | H04W 4/08 |
| 2019/0073693 | A1 | 3/2019 | Moukaddem et al. | |
| 2019/0266276 | A1 | 8/2019 | Patel et al. | |
| 2019/0347668 | A1 | 11/2019 | Williams et al. | |
| 2019/0386949 | A1* | 12/2019 | Vennam | G06Q 10/109 |
| 2020/0021544 | A1 | 1/2020 | Miklos et al. | |
| 2020/0145358 | A1 | 5/2020 | Yegorin et al. | |
| 2020/0153760 | A1 | 5/2020 | Pace | |
| 2020/0250625 | A1 | 8/2020 | Peltier et al. | |
| 2020/0252361 | A1 | 8/2020 | Peltier et al. | |
| 2022/0070630 | A1 | 3/2022 | Rubin et al. | |

OTHER PUBLICATIONS

U.S. Appl. No. 16/780,893, Non-Final Office Action, dated Oct. 2, 2020, 28 pages.
International Search Report and Written Opinion for PCT/US2020/016454, dated May 7, 2020, 12 pages.
European Search Report dated Mar. 12, 2021, for EP Application No. 18817110.2, seven pages.
Final Office Action dated Apr. 30, 2021, for U.S. Appl. No. 16/780,893, filed Feb. 3, 2020, 30 pages.
Final Office Action dated Feb. 17, 2021, for U.S. Appl. No. 16/622,784, filed Dec. 13, 2019, 36 pages.
International Preliminary Report dated Dec. 26, 2019, for PCT/US2018/037401, two pages.
International Search Report and Written Opinion dated Sep. 11, 2018, for PCT/US2018/037401, 14 pages.
Non-Final Office Action dated Dec. 8, 2020, for U.S. Appl. No. 16/780,878, filed Feb. 3, 2020, 14 pages.
Non-Final Office Action dated Jun. 11, 2020, for U.S. Appl. No. 16/622,784, filed Dec. 13, 2019, 32 pages.
Non-Final Office Action dated May 25, 2021, for U.S. Appl. No. 16/780,893, filed Feb. 3, 2020, 17 pages.
Non-Final Office Action dated Oct. 2, 2020, for U.S. Appl. No. 16/780,893, filed Feb. 3, 2020, 27 pages.
Final Office Action dated Sep. 15, 2021, for U.S. Appl. No. 16/780,878, filed Feb. 3, 2020, 17 pages.
International Preliminary Report dated Aug. 12, 2021, for PCT/US2020/016454, filed Feb. 3, 2020, seven pages.
Notice of Allowance dated Sep. 13, 2021, for U.S. Appl. No. 16/780,893, filed Feb. 3, 2020, eight pages.
European Search Report dated Feb. 10, 2022, for EP Application No. 20748971.7, eight pates.
Final Office Action dated Dec. 29, 2021, for U.S. Appl. No. 16/780,890, filed Feb. 3, 2020, 12 pages.
International Search Report and Written Opinion dated Dec. 6, 2021, for PCT/US21/49170, filed Sep. 3, 2021, 13 pages.
Non-Final Office Action dated Oct. 14, 2021, for U.S. Appl. No. 16/622,784, filed Dec. 13, 2019, 36 pages.
Notice of Allowance dated Jan. 14, 2022, for U.S. Appl. No. 16/780,893, filed Feb. 3, 2020, eight pages.

\* cited by examiner

SYSTEM AND METHOD FOR DETERMINING SENTIMENT AND/OR SEMANTICS OF RESPONSES IN A ONE-TO-MANY MESSAGING PLATFORM

CROSS-REFERENCES TO RELATED APPLICATIONS

The present application claims the benefit of priority of U.S. Provisional Application No. 62/800,403 filed on Feb. 1, 2019; and entitled "One to Many Messaging Platform," the entirety of which is hereby incorporated by reference herein.

TECHNICAL FIELD

The subject matter described herein relates to an electronic messaging platform, and more particularly to a system and method for grouping responses in a one-to-many messaging platform for exchanging messages between a client (such as an influencer, celebrity, company or the like) and users (such as fans of the client).

BACKGROUND OF THE INVENTION

Electronic messaging exists in many different forms, and typically occurs over a wireless communication channel between computing devices, which are often mobile computing devices such as smart phones, laptop computers, or tablet computers. Electronic messages can take the form of text, graphic (such as an image, video, or other graphic such as an "emoji." There are many different electronic messaging protocols, such as Short Messaging Service (SMS), which is often limited only to short text messages, and Multimedia Messages (MMS), which can contain digital images, videos, audio content, and ideograms such as emojis, GIFs, or the like, etc.

There also exists various application platforms for exchanging electronic messages. Most commonly, electronic messages are sent and received over a wireless cellular network based on a user's long-code phone number, i.e. in the U.S., the three-digit area code plus seven-digit mobile phone number that is assigned to a user by a carrier that controls the wireless or cellular network and manages any traffic on such network.

While most messaging is performed peer-to-peer (P2P) or even in small groups, one-to-many communication of messaging at a massive scale, i.e. a "social media" type application having more than just a handful of message recipients, is technically difficult and challenging. Other than social media applications and platforms such as Facebook®, Twitter®, Instagram®, and others, large-scale communication of messages between clients (also referred to herein as "influencers," "celebrities," or the like) and associated users (also referred to herein as "fans," "audience," "followers," or the like) is limited by the wireless networks and the carriers that manage them, and by the technologies themselves. However, engagement rates, which define how engaged a user might be to interacting with, following, or communicating with a client, over text messaging far surpass the engagement rates on social media platforms mentioned above. Yet still, at large scale, clients have a difficult time managing and keeping up with the large numbers of messages, both transmitted and received. Audience platforms and audience targeting exist, but have not been done for text messaging platforms because one-to-many communication has previously not been possible at large scale.

For instance, there currently exists no platform that allows devices associated with long-code phone numbers to send a large volume of messages. No current social media platform allows users to connect with clients over text messaging, particularly using such long-code phone numbers, nor allows clients to engage directly with their users without intermediation by a social media platform.

What is needed is a messaging platform that provides flighting (i.e. transmission over one or more communication networks) of one-to-many text messages (both text and content-rich messages), and which performs multivariate testing of messages before they are send out broadly to the entire target audience. Also needed is a platform that gives clients tools that are needed to manage the incoming volume of messages through grouping and aggregating, and by application of machine learning and artificial intelligence algorithms that augment a client's natural messaging style and tone. Finally, such a platform needs recommendations and authoring assistance for text message communications.

BRIEF SUMMARY OF THE INVENTION

This document describes a messaging platform, system and method that provides for one-to-many (and many-to-one) message transmission over one or more communication networks). The messages can be text and/or content-rich messages, and the communication networks can be a wireless network that is managed and controlled by one of the various wireless communication carriers. In some implementations, a system and method described herein performs multivariate testing of messages before they are transmitted to a target audience. The multivariate testing can include analytics to ascertain whether a message is contextually appropriate, based on a current environment, audience base, topic, or the like. The systems and methods provide tools to manage a large volume of incoming and outgoing messages, through grouping and aggregating, and by application of machine learning and artificial intelligence algorithms that augment a client's natural messaging style and tone, as well as provide a recommendations and authoring engine for increasing responsiveness and communication between clients and their users.

In some aspects, a method and system are described for grouping responses in a one-to-many messaging platform are described. In certain aspects, a method includes the steps of receiving, by a messaging platform, a plurality of response text messages from a corresponding plurality of users in response to a first text message from a client, the first text message being transmitted via one or more messaging services that interface with the messaging platform. The method further includes analyzing, by a computer processor associated with the messaging platform and according to executable instructions, one or more attributes associated with each of the plurality of response text messages. The method further includes generating, by the computer processor, metadata for each of the plurality of response text messages, the metadata representing the one or more attributes associated with each of the plurality of response text messages or a user associated with selected ones of each of the plurality of response text messages. The method further includes storing, by the computer processor, the metadata for each of the plurality of response text messages in a database, the storing further including linking the metadata with the content of each of the plurality of response text messages.

In some other aspects, a method and system for determining sentiment and/or semantics of responses in a oneto-many message platform are described. In one aspect, a method includes communicating, via one or more messaging services that interface with a messaging platform, one or more text messages between a client and a plurality of users. The method further includes receiving, by the messaging platform via the one or more messaging services, user text messages from individual ones of the plurality of users. The method further includes executing, by a machine learning module of the messaging platform, one or more artificial intelligence algorithms on the received user text messages, and processing, according to the artificial intelligence algorithms of the machine learning module. The method further includes generating, based on one or more of variables associated with the processed user text messages, metadata for each of the user text messages, the metadata representing one or more attributes associated with content of each of the plurality of user text messages or a user associated with the user text messages.

In some other aspects, a method and system for segmenting users of a one-to-many messaging platform are described. In certain aspects, a method includes receiving, by a messaging platform, a first text message from a client via a first messaging service that interfaces with the messaging platform, the first text message being configured for transmission via one or more second messaging services to user devices corresponding with a plurality of users, each of the plurality of users being registered with the messaging platform and associated with the client via the messaging platform. The method further includes segmenting, by the messaging platform, the plurality of users according to one or more user segments, each of the one or more user segments being based on one or more user attributes associated with the plurality of users, the one or more attributes being defined by static metadata that is generated when each user is registered with the messaging platform, and by dynamic information about user behavior using the messaging platform and/or the one or more second messaging services. The method further includes customizing, by the messaging platform, the first text message into a set of one or more second text messages according to the segmenting, the customizing providing a context to each of the set of second text messages, the context corresponding to the one or more user attributes. The method further includes transmitting, by the messaging platform via the one or more second messaging services, the set of second text messages to the user devices associated with each of at least some of the plurality of users.

In some other aspects, a method and system for multivariate testing of messages to a subgroup in a one-to-many messaging platform are described. In certain aspects, a method includes generating, by a messaging platform, a text message associated with a client, the message being generated for transmission to a plurality of users via one or more messaging services, and defining, by the messaging platform, a subset of the plurality of users, the subset being defined according to one or more attributes associated with the text message and/or the plurality of users. The method further includes transmitting, by the messaging platform and via at least one of the one or more messaging services, the text message to the subset of the plurality of users. The method further includes analyzing, by the messaging platform, one or more variables of the transmitting of the text message to the subset of the plurality of users, the analyzing generating performance metrics of the text message relative to the subset of the plurality of users. The method further includes optimizing, by the messaging platform, the text message based on the performance metrics generated from the analyzing, and configuring, by the messaging platform, the optimized text message for transmission to the plurality of users or other subsets of the plurality of users via the one or more messaging services.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a messaging platform, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION OF THE INVENTION

One-to-Many Communication Over Text at Massive Scale

Figure 1:
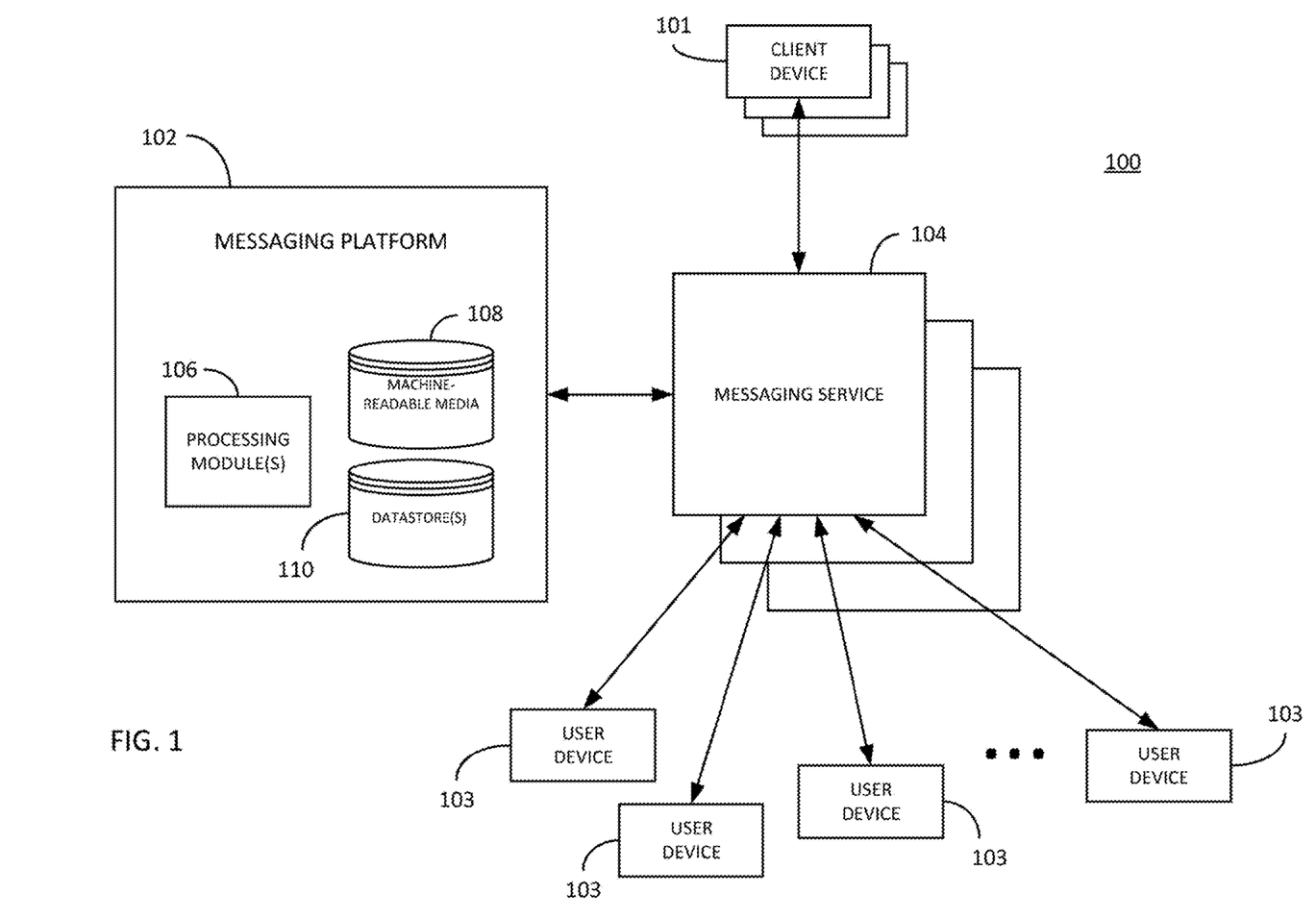
FIG. 1 illustrates a one-to-many messaging platform.

In accordance with some implementations of the subject matter described herein, a Software-as-a-Service (SaaS) platform is provided which facilitates one-to-many communication over text messaging at massive scale. FIG. 1 illustrates a system 100 for managing inbound and outbound messages at large to massive scale, from individual ones of clients to several and up to many millions of users. The system 100 includes a messaging platform 102 for processing, storing and executing various automated functions on messages exchanged between a client device 101, such as mobile phone, tablet computer, laptop computer, desktop computer, or the like, and a number of user devices 103, also such as mobile phone, tablet computer, laptop computer, desktop computer, or the like. Each of the client device 101 and user devices 103 include communication modules such as a transceiver or radio for communicating messages wirelessly over one or more messaging services 104, such as is provided by a wireless carrier, an application provider, or other service provider.

The messaging platform 102 of the system 100 includes one or more processing modules 106 that execute instruction from non-transitory machine-readable media 106, or which include a hard-wired processor such as an application-specific integrated circuit (ASIC), a reprogrammable or reconfigurable processor such as a field-programmable gate array (FPGA), or other computer processor. The one or more processing modules 106 process user and client data, as well as inbound and outbound messages (in both directions), for aspects such as sentiment, content, semantics, mood, receptiveness, or the like, and which are further described below. The messaging platform 102 further includes one or more datastores 110, which can include one or more of a relational database, a non-relational database, a database cluster of distributed database nodes, and/or cloud storage. Each datastore 110 includes both hardware and software to execute data storage, organization, and retrieval functions.

As in one example, a large number of users can text their favorite clients just as easily as they would text a friend or family member. Clients of the platform can capture, segment, and reach millions of users using a communication channel that provides unparalleled engagement rates. Clients can send videos, images, text and/or emojis directly with each individual user of their audience in one-to-one direct messages, or send broadcasts of messages to their entire audience at thousands of messages per second, without being filtered or otherwise limited by SMS carriers. Clients can reach their users directly and build audience identity and targeting data directly, without depending on social media platforms who hoard this information from the client. Clients can do this using an actual, durable long-code phone number so that users can store the client in their address book or contact list in their user device 103.

Accordingly, each user can use the system as if they have a direct connection to a client. In some implementations, the system employs intelligence in the form of machine learning or artificial intelligence to help clients and their users who to engage with, and when. The system provides scalability, so that each client can understand and interact personally with millions of users, as augmented by the system to assist the client in generating realistic messages that are contextually-relevant and even user-specific.

In some implementations, the system generates a unique long-code telephone number for each client. The system collects data from each user who sends a message to the client according to the assigned unique long-code telephone number and via any of a number of communication channels or messaging services thereon. The system monitors activity, location, and purchases by users to provide clients intelligent suggestions on who to message. These targeted messages can be contextually-aware and relevant to the messaging content, as well as user preferences and engagement levels.

In preferred implementations, the system includes a client dashboard. The dashboard can be formatted for a desktop or laptop computer graphical user interface (GUI), or for a user interface (UI) of a mobile device such as a mobile smart phone or tablet computer. The dashboard can be generated by a computer program or application, and can be integrated or connected with an analytics engine and/or performance and monitoring engine.

The system can include one or more application programming interfaces (APIs) for interfacing with, without limitation, a cloud communication platform such as Twilio®, and a computing resource manager such as Apache Mesos®. The system includes a data management platform (DMP) that stores all the information about the audience of each client. The DMP can be a multi-tenant database to segregate the data based on client, and can protect the data by any number of data protection measures. For instance, user (audience) data can be secured so as to not be shared or accessed by third party data processing systems, which is a major flaw of conventional social networking platforms.

The system can be configured to perform grouping and aggregating. Messages particularly from users, can be grouped and/or aggregated by area code, city, age, state, sex. In some implementations, messages can be grouped by content aware grouping, using AI, Natural Language processing, etc. for creating topics and/or conversations. In this manner, if a conversation is defined for a group of messages, they can be aggregated by conversation to involve multiple clients and all of each of the clients' users.

The dashboard provides message sorting of inbound messages based on any of a number of variables or settings, such as keywords, contextual analysis, user demographics, or the like. The dashboard also allows client to manage their messaging activity with their users by aggregating, segregating, filtering, testing, or processing messages according to any number of variables, such as user demographics, number of messages, local time zones, message content, or the like.

Flighting of One-to-Many Text Messages

When sending a message to a large audience, first send variations of the message to smaller sample sets and measure the performance of each variation against target metrics. The system automatically performs analytics on the metrics for statistical significance and hitting goals, and allows the sender to send the best variation of a message to the entire audience, or to send different variations to different large subsets based on audience targeting/demographics. Through multivariate testing, a feedback loop is created that enables optimization of the messages over time, against key performance metrics.

For example, the system can generate and enable transmission of "trial balloon" messages to select users, and which are configured to test user receptiveness.

Recommendations and Authoring Assistance for Text Message Communications

When sending a message to a large audience and getting large numbers of replies, prioritize and group the replies so that the sender can focus on the ones that matter, and can send additional broadcast messages to responders grouped by similar replies or other common characteristics. Automatically generate groupings based on analysis of reply content, and automatically generate suggested replies to those groups. Automatically prioritize these conversations for the sender. In any one-to-many communication system, the large numbers of replies are impossible to manage on a one-to-one basis and need to be grouped and replied to in batches. Software-assisted grouping, along with the other features listed above, enable senders to effectively maintain two-way communication with large numbers of recipients.

Figure 2:
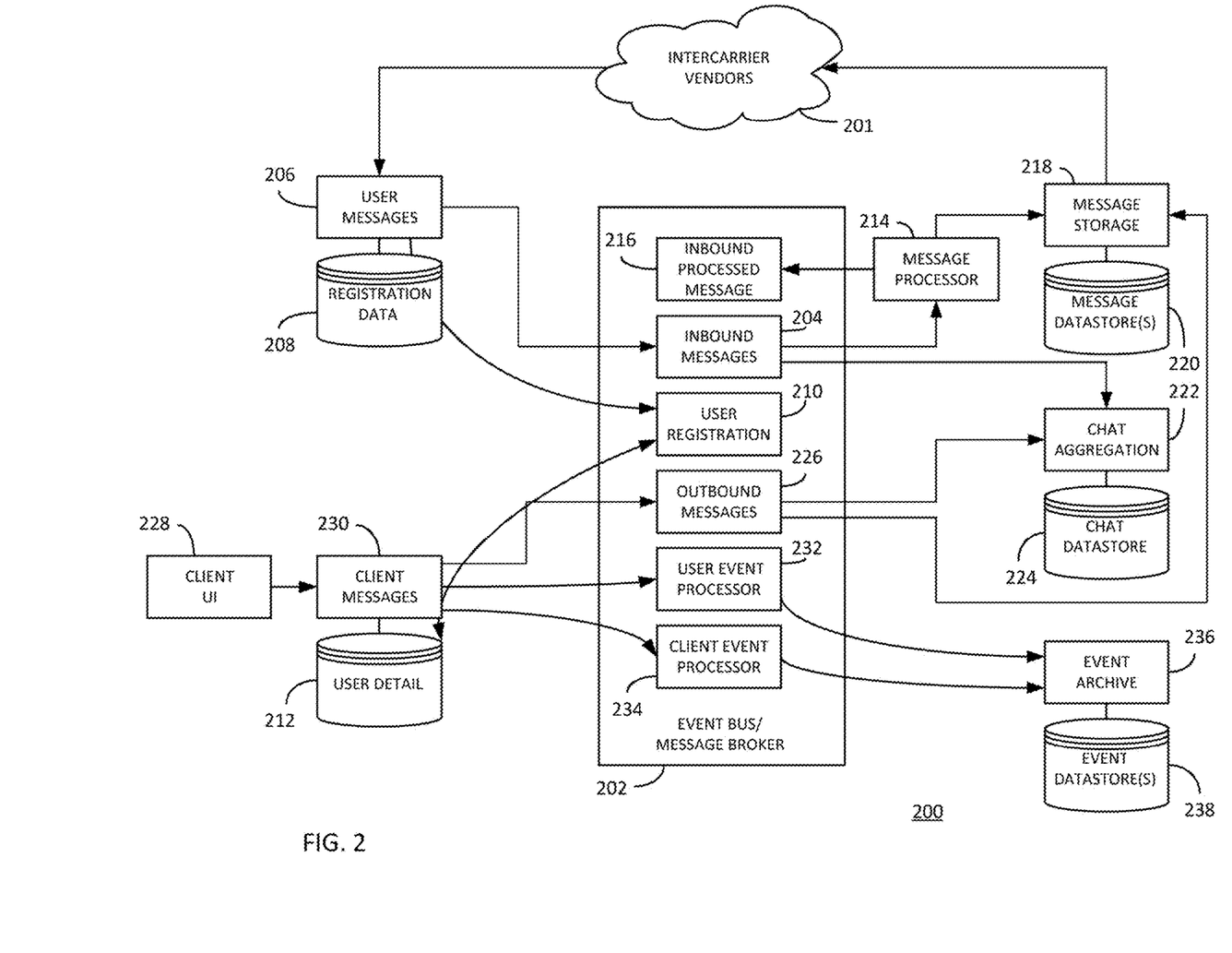
FIG. 2 illustrates a messaging architecture for a one-to-many messaging platform.

The system can include one or more processing modules for executing various functions. FIG. 2 illustrates a messaging platform 200 that provides an event bus and message broker 202. The event bus and message broker 202 processes, queues and manages inbound and outbound messages that are transmitted via one or more messaging services provided by intercarrier vendors. In some implementations, the event bus and message broker can use advanced message queuing protocol (AMQP) or the like. The event bus and message broker 202 includes an inbound messages module 204 for managing messages received from one or more of the intercarrier vendors 201 via a user messages processor module 206, which can include a message service handler (MSH) or message gateway, such as Hermes® or the like.

User messages inbound from the intercarrier vendors 201 are checked against user registration data in a user registration datastore 208 for existing, registered users, and then queued for being processed by the inbound messages module 204 of the event bus and message broker 202. Any messages received from a non-registered user are queued in a user registration module 210 for onboarding the user, where user information such as demographic data, phone number, behavioral information, or the like, is stored in a user detail datastore 212. At least some of the inbound messages received by the inbound messages module 204 are sent to message processor, which processes the messages with one or more artificial intelligence algorithms or machine learning for executing functions such as, without limitation, determining semantics, sentiments and or mood, user engagement, or the like. Processed messages are sent to an inbound processed message module 216 for functions such as filtering, grouping (both by user, such as age, gender, city, or the like, and by message, such as message content, semantics or sentiment), and other functions. Processed inbound messages are also sent by the message processor 214 to a message storage module 218 for storage in a message datastore 220, which stores a permanent message record, which messages.

Inbound messages that are not processed by the message processor 214 can be sent to a chat aggregator 222 for aggregation, recordation and persistence in a chat datastore 224. These inbound messages can be combined with outbound messages based on their being part of an ongoing "chat" or dialog of related messages or messaging threads.

The event bus and message broker 202 further includes an outbound messages module 226 that receives client messages from a client user interface (UI), such as is provided by a messaging application on the client device, or from a dashboard provided by the messaging platform, and via client messages processor 230. The client messages processor 230 checks outbound messages from the client to the users against the user detail datastore 212 to ensure each targeted user is registered and/or active with the system 200, or to assist in modifying, curating, filtering or other processing of outbound messages, such as adding text to the message, modifying or augmenting a message based on user behavior or demographics, or the like. As with the inbound messages module 204, the outbound messages module 226 can send some or all of the outbound messages to the chat aggregator 222 for aggregation, recordation and persistence in the chat datastore 224. The outbound messages module 226 also sends outbound messages to the message storage module 218 for storage in the message datastore 220, and for dispatch to the intercarrier vendors 201.

Outbound messages from a client define an event, which can be further processed by user event processor 232 if related to one or more users, or client event processor 234 if related to the client. Events are sent to an event archive for storage in an event datastore 238.

In some implementations, the system 200 is configured with a module for churn predicting, i.e. a modeling system for predicting churn or a propensity of a user to drop out of the messaging platform. The goal of the modeling system is to optimize engagement by users with the clients. In some cases, the system can employ natural language processing to ascertain a mood or engagement of a user. In other cases, the system can automatically generate a "suggestion card" message soliciting input from one or more users that have exhibited some kind of targeted behavior or even mood.

Audience Platform for Messaging

When sending a message to a large audience or large group of users, the audience can be defined from a larger pool of potential recipients based on information known about them. For example, a client wants to send a text message to all Spanish-speaking women in the Miami area that are part of a list of potential recipients. The target audience can be segment by name, gender, age, geography, and/or previous communications with user recipients (i.e. did a user reply to the client in the last week, or are there any recognizable patterns), along with anything else that can be discerned from the use history, including topics that they are interested in (ex: if a user sends #Iowa, or #human trafficking, the system can quickly understand the user's affinities of aspects of a client's life or existence to develop and direct, or target, users with specific message content).

Users can be counted and/or tracked for gamification purposes. For instance, each client can display their number of users and/or active engagement thereof. Users can be filtered or prioritized by their join date, i.e. the date of which they officially joined in the service. Each user can be tracked for their engagement or participation on the system. For instance, the system can track each user's number of messages, particularly as related to responses to messages sent or broadcast by clients to many different users. The system can be configured to generate a queue of messages to be sent to each of the number of users, and the queue can be prioritized so as to be segmented for optimal transmission according to, among other variables, carrier constraints, message channel bandwidth, local time of a recipient, or other variables.

The system can be configured to track responses per message from a client, responses per conversation (i.e. a collection of messages in a common messaging thread), as well as other user metrics, such as response rate, message context as related to response rate, and other metrics.

In some implementations, a system can include a digital rights management (DRM) module to track and manage digital content distribution. Such DRM module can be integrated with customer relationship management (CRM) system so as to leverage user engagement with the clients, to generate reports and campaigns for various items such as merchandising, content distribution, or viral distribution of groups among users that are related in some way, either by interest or demographics, or otherwise.

The system can be configured to define one or more events related to messaging by the client to their users. In these instances, the system can define a time or time period in which messages will be generated and sent, and this time or time period can also be broadcast to the user base, as well as others, to generate interest and interaction by the users with the client. The client can either manually control such events, or the events can be automatically by the system using ML or AI algorithms.

In some implementations, the system can include a translator to translate messages from an original language into a different language. The translation can be automatic, and can occur bi-directionally, i.e. from client to user(s) or from user(s) to client.

Natural language processing can be used by the system to determine one or more parameters of the messages, such as, without limitation, message start, conversation end, new conversation, message context, dynamic contextual relationships, etc. Further, the natural language processing can be used by the system to generate new messages on behalf of the client, which closely track and mimic a client's tone, idioms, axioms, and other personality-specific traits related to the client.

Figure 3:
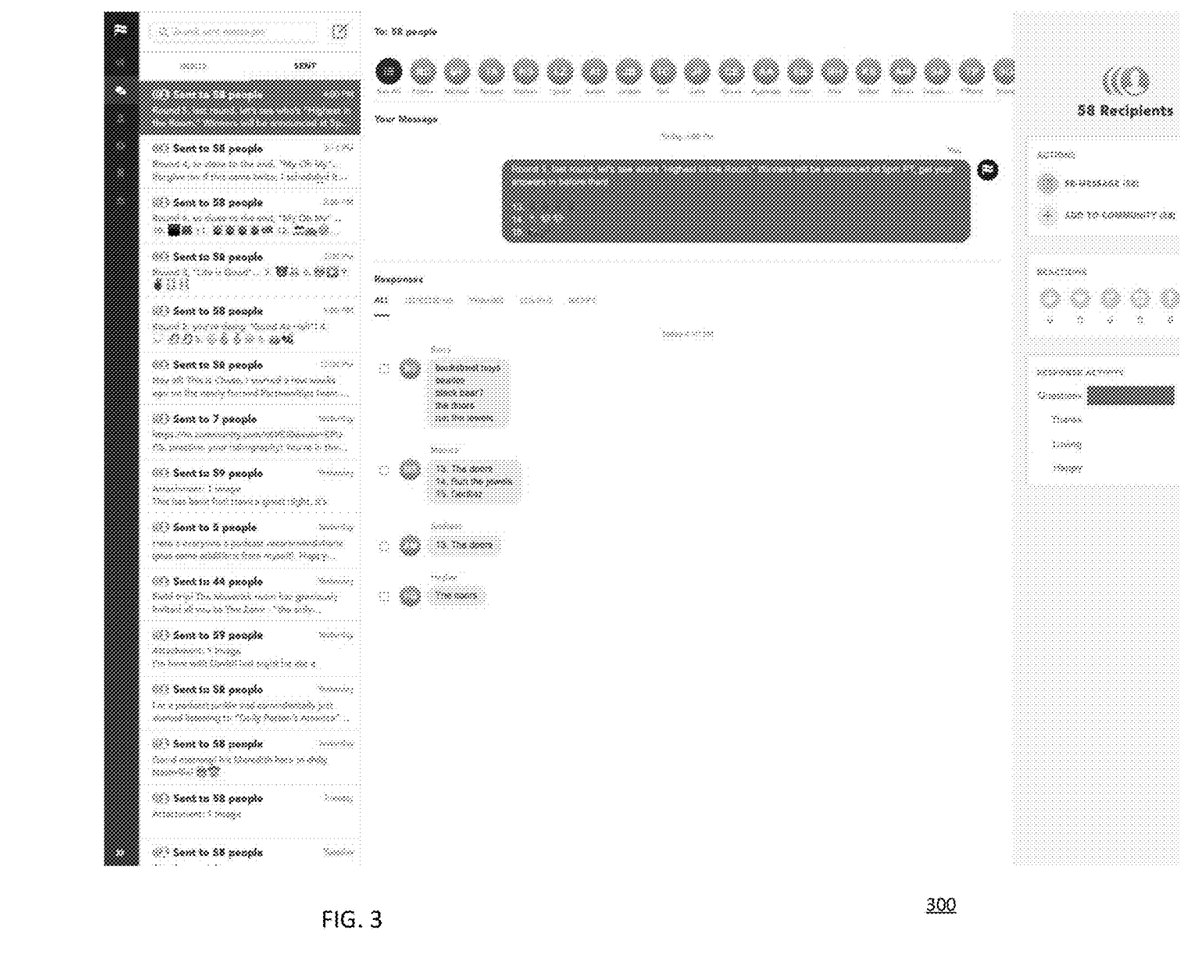
FIG. 3 depicts a client user interface and dashboard in accordance with implementations described herein.
Figure 4:
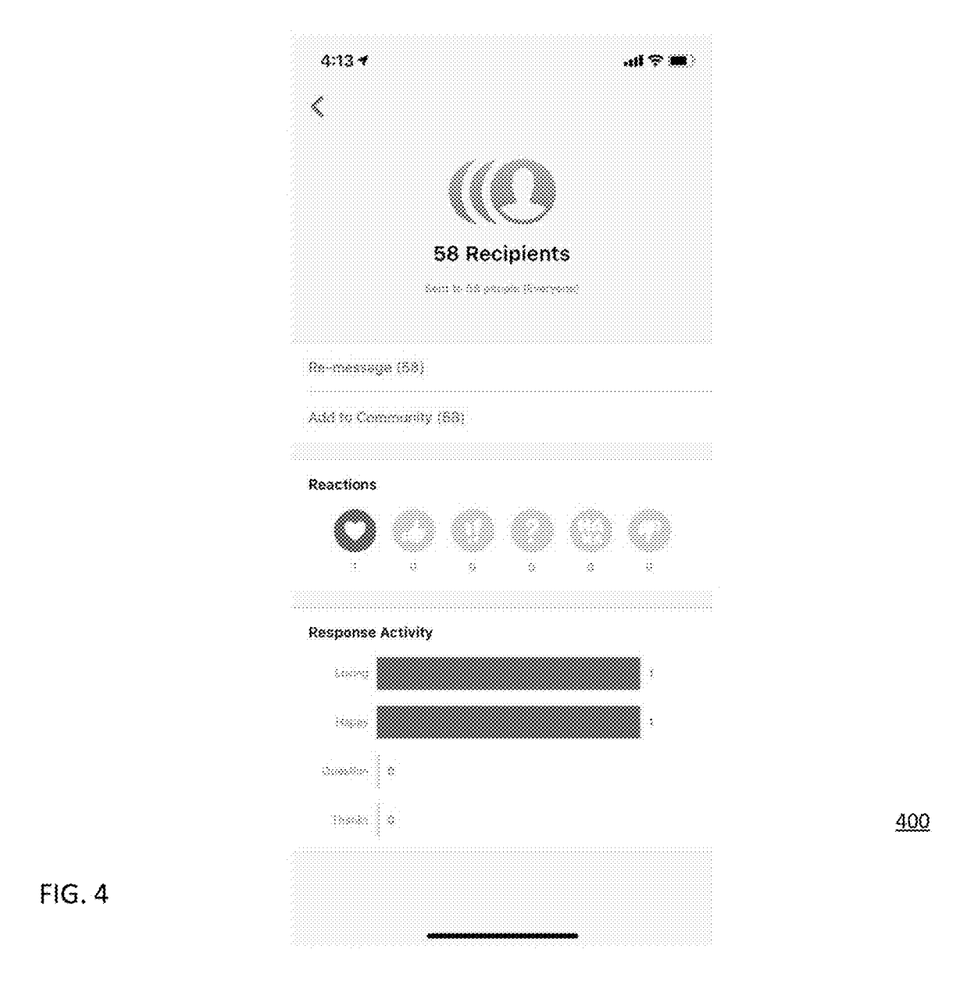
FIG. 4 depicts a client mobile device user interface in accordance with implementations described herein.
Figure 5:
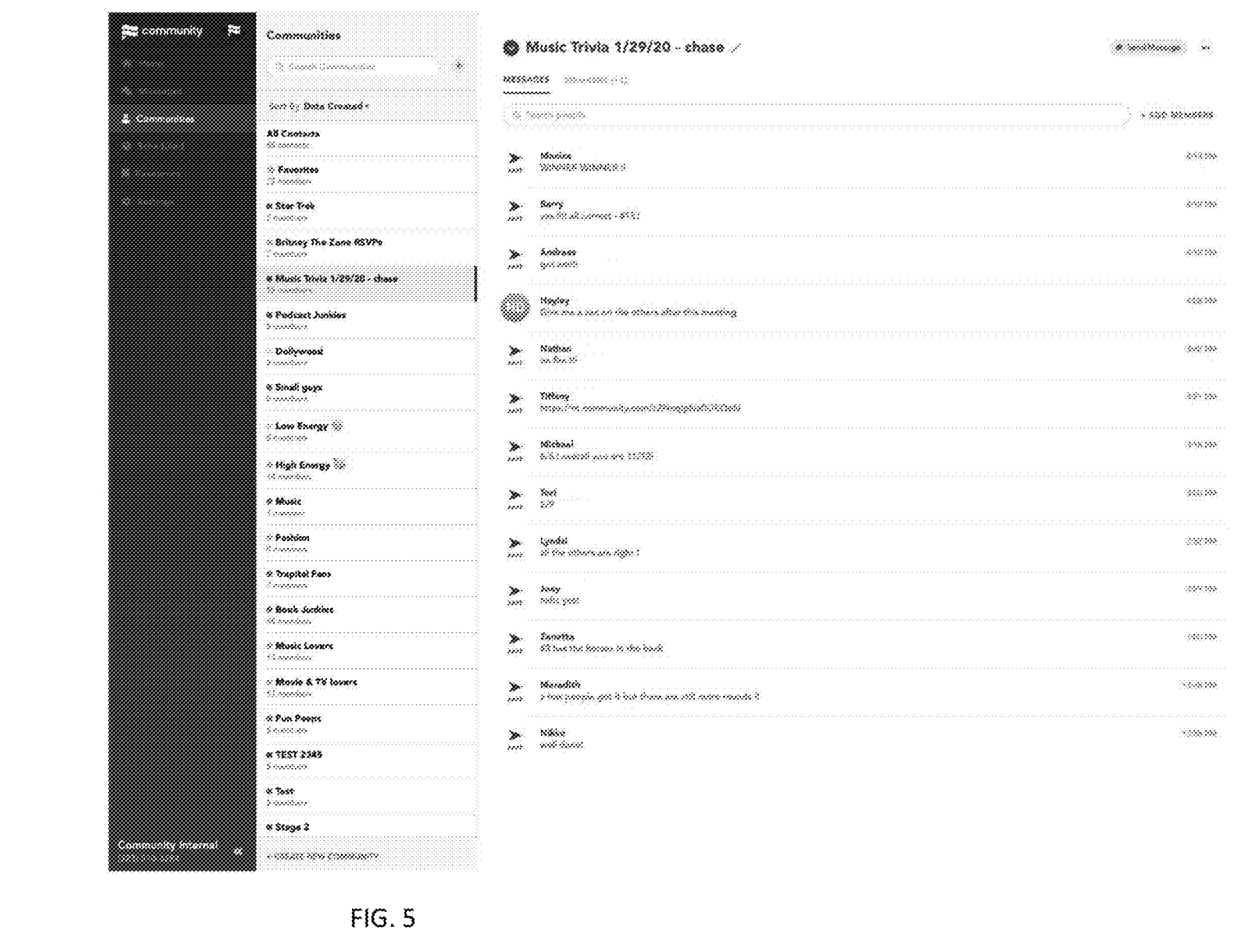
FIG. 5 depicts a client user interface and dashboard in accordance with implementations described herein.

FIG. 3 depicts a user interface or dashboard 300, in which a client can view and manage inbound and outbound messages, view the users associated with each outbound message, and view responses from the users. In some instances, only a subset of users will respond, and accordingly, the dashboard 300 can include a window to track user actions and reactions, so as to view sentiment, engagement, or the like. FIG. 4 depicts a user interface or dashboard 400 that allows a client to track user actions and reactions on their client device such as a mobile phone or tablet computer, for example. As depicted in FIG. 5, the messaging platform can also provide a client dashboard 500 for grouping users into one or more "communities," in which users are grouped based on their interests, the registration to the community, their demographics or other groupings. Each community can be selected to display activity history or trending actions. The history or trends can be displayed according to user, time of receipt, or other display preference by the client.

Figure 6:
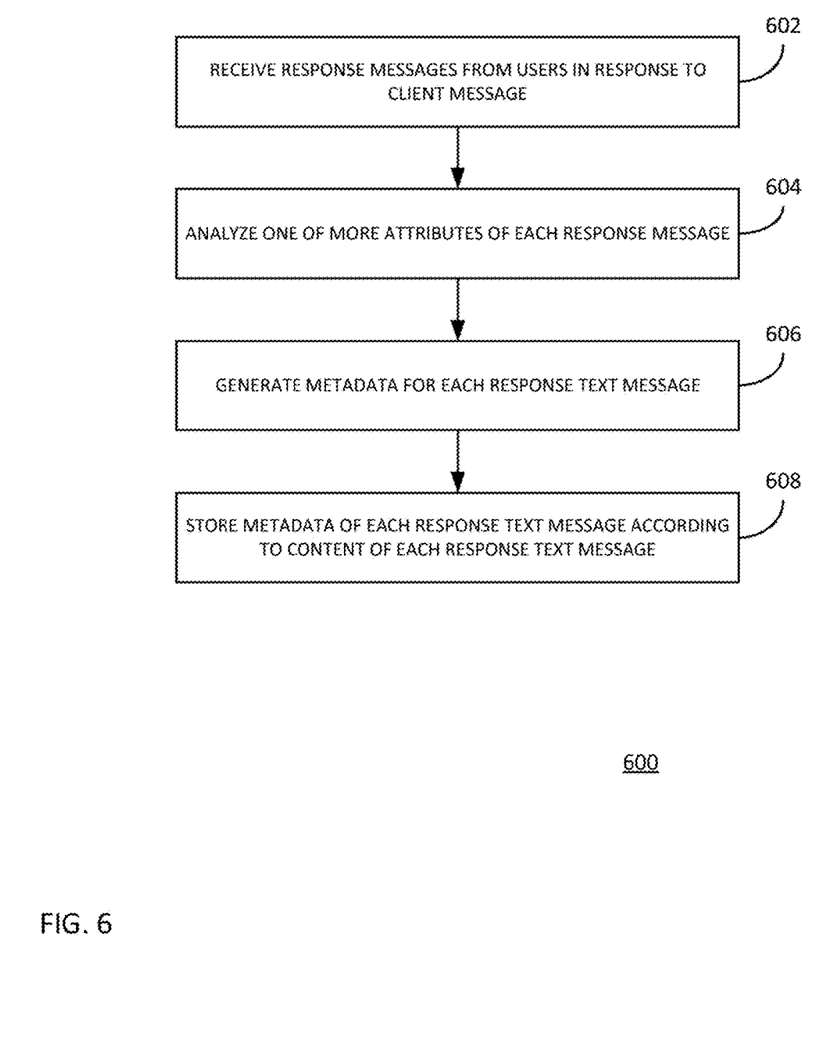
FIG. 6 is a flowchart of a method for grouping responses in a one-to-many messaging platform.

FIG. 6 is a flowchart of a method 600 for grouping responses in a one-to-many messaging platform. At 602, response text messages are received by a messaging platform from a corresponding number of users in response to a first text message from a client. The response text messages can number between 2 and perhaps many millions or more. The first text message and the response text messages are transmitted via one or more messaging services that interface with the messaging platform. At 604, a computer processor associated with the messaging platform executes instructions to analyze one or more attributes associated with each of the response text messages. At 606, the computer processor generates metadata for each of the plurality of response text messages. The metadata represents the one or more attributes associated with each of the response text messages or a user associated with selected ones of each of the response text messages. At 608, the computer processor stores the metadata for each of the response text messages in a database. The storing at 608 further including linking the metadata with the content of each of the response text messages, so as to effectively group the responses messages for functions such as assessing reactions, user actions, semantics, sentiment, or the like.

Figure 7:
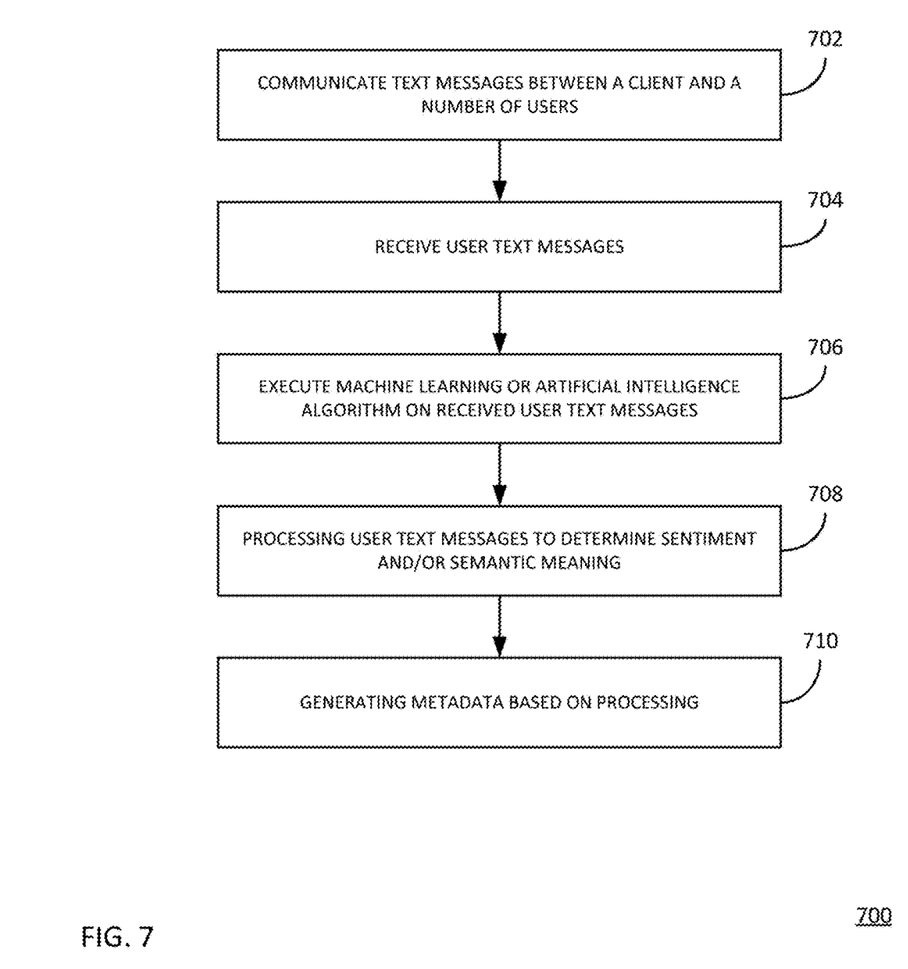
FIG. 7 is a flowchart of a method for determining sentiment and/or semantics of responses in a one-to-many messaging platform.

FIG. 7 is a flowchart of a method 700 for determining sentiment and/or semantics of responses in a one-to-many messaging platform, communicating. At 702, one or more text messages are communicated between a client and a number of users, via one or more messaging services that interface with a messaging platform. At 704, the messaging platform receives user text messages from individual ones of the plurality of users via the one or more messaging services. At 706, a machine learning module of the messaging platform executes one or more artificial intelligence algorithms on the received user text messages, and at 708, processes the user text messages according to the artificial intelligence algorithms. At 710, based on one or more of variables associated with the processed user text messages, metadata is generated for each of the user text messages. The metadata represents one or more attributes associated with content of each of the plurality of user text messages or a user associated with the user text messages. The attributes can include sentiment, semantic meaning, or can represent user action or reaction.

Figure 8:
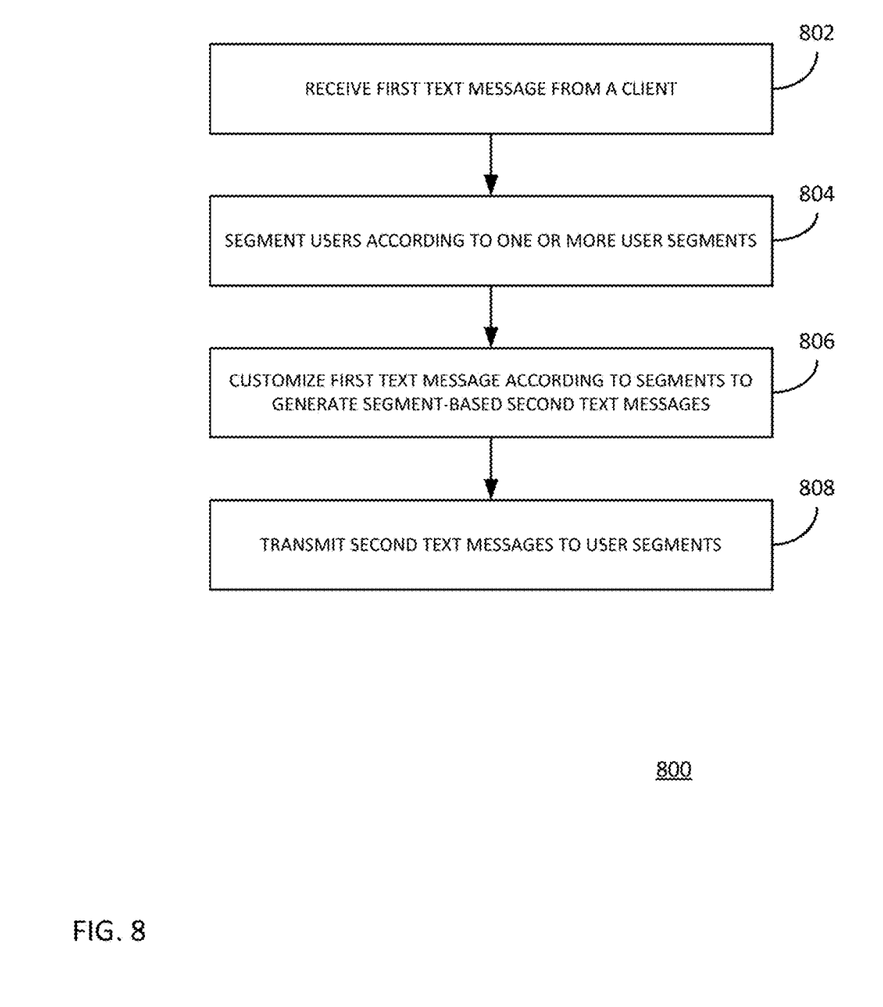
FIG. 8 is a flowchart of a method for segmenting users of a one-to-many messaging platform.

FIG. 8 is a flowchart of a method 800 for segmenting users of a one-to-many messaging platform. At 802 a messaging platform receives a first text message from a client via a first messaging service that interfaces with the messaging platform. The first text message is configured for transmission via one or more second messaging services to user devices corresponding with a number of users. Each of the users being are registered with the messaging platform and associated with the client via the messaging platform. For instance, each user can be associated to a common group or "community" of users, around a common trait or interest. At 804, the messaging platform segments the users according to one or more user segments. Each of the one or more user segments can be based on one or more user attributes associated with the users. The attributes can be defined by static metadata that is generated when each user is registered with the messaging platform, and/or by dynamic information about user behavior using the messaging platform and/or the one or more second messaging services. At 806, the messaging platform customizes the first text message into a set of one or more second text messages. The customizing is based on the segmenting, and provides a context to each of the set of second text messages, where the context corresponds to the one or more user attributes. At 808, the messaging platform transmits, via the one or more second messaging services, the set of second text messages to the user devices associated with each of at least some of the users.

Figure 9:
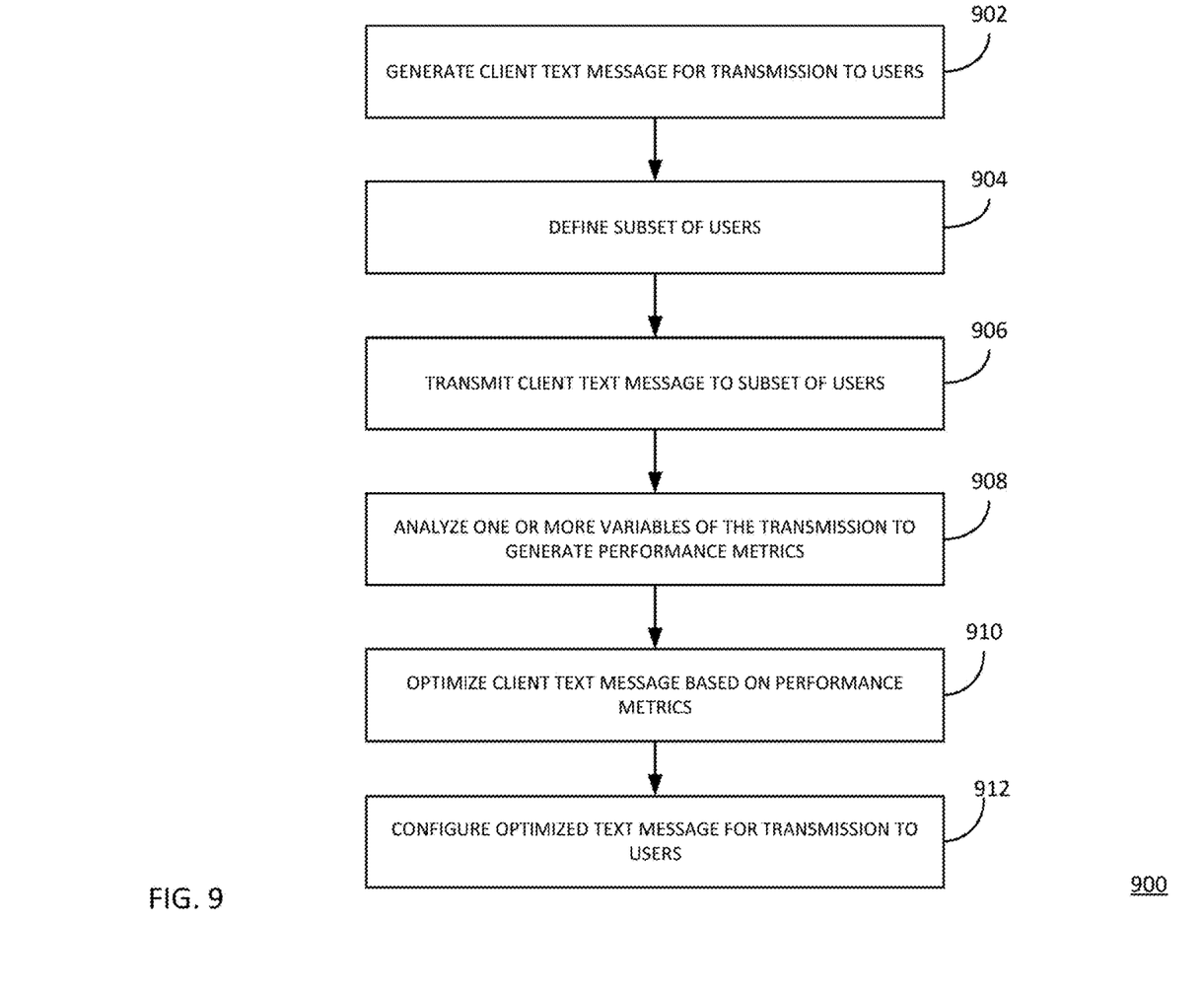
FIG. 9 is a flowchart of a method for multivariate testing of messages to a subgroup in a one-to-many messaging platform.

FIG. 9 is a flowchart of a method for multivariate testing of messages to a subgroup in a one-to-many messaging platform. At 902, a messaging platform generates a text message associated with a client, the message being generated for transmission to a plurality of users via one or more messaging services. At 904, the messaging platform defines a subset of the plurality of users, the subset being defined according to one or more attributes associated with the text message and/or the plurality of users. At 906, the messaging platform transmits the text message to the subset of the plurality of users via at least one of the one or more messaging services. At 908, the messaging platform analyzes one or more variables of the transmitting of the text message to the subset of the plurality of users, the analyzing generating performance metrics of the text message relative to the subset of the plurality of users. At 910, the messaging platform optimizes the text message based on the performance metrics generated from the analyzing. At 912, the messaging platform configures the optimized text message for transmission to the plurality of users or other subsets of the plurality of users via the one or more messaging services.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A messaging system for two-way text message communications, the messaging system comprising:
   a user database;
   a message database;
   a chat database separate from the message database;
   an event database separate from the message database and further separate from the chat database; and
   a plurality of processors comprising a user event processor and a client event processor, the plurality of processors configured to perform a method comprising:
   receiving, via an intercarrier message vendor, a first user text message from a user of a plurality of users;
   in response to receiving the first user text message, determining whether the user corresponds to a registered user;
   in accordance with a determination that the user does not correspond to a registered user, storing user information associated with the user in the user database;

receiving, via the intercarrier message vendor, a second user text message from the user;

determining, based on a content of the second user text message, a user behavior associated with the user;

receiving, via a client user interface, a first client text message from a client;

receiving, from the client, a recipient preference;

determining, based on the user information from the user database and based further on the user behavior, whether the recipient preference is associated with the user;

modifying the first client text message to generate a second client text message;

in accordance with a determination that the recipient preference is associated with the user, presenting, via the intercarrier message vendor, the second client text message to the user;

in accordance with a determination that the second client text message is related to one or more users of the plurality of users, storing the second client text message in the event database via the user event processor;

in accordance with a determination that the second client text message is related to the client, storing the second client text message in the event database via the client event processor;

aggregating the second client text message and the first user text message to create a chat file;

storing the chat file in the chat database; and storing the second user text message in the message database, wherein modifying the first client text message to generate the second client text message comprises modifying the first client text message based on one or more of the user information and the user behavior.

2. The messaging system in accordance with claim 1, wherein the user information comprises demographic information associated with the user.

3. The messaging system in accordance with claim 1, wherein determining the user behavior comprises determining a semantic meaning of the second user text message.

4. The messaging system in accordance with claim 1, wherein the method further comprises:

receiving a third user text message from a second user of the plurality of users; and identifying, based on the third user text message, a relationship between the user and the second user.

5. The system of claim 1, wherein presenting the second client text message to the user comprises presenting the second client text message to the user via a SMS service.

6. The system of claim 1, wherein presenting the second client text message to the user comprises presenting the second client text message to the user via a MMS service.

7. The system of claim 1, wherein the first user text message is addressed to the client via a long-code telephone number associated with the client.

8. The system of claim 7, wherein presenting the second client text message to the user comprises identifying the long-code telephone number to the user.

9. The system of claim 1, the method further comprising presenting the second user text message to the client.

10. A method of two-way text message communications, the method comprising:

receiving, via an intercarrier message vendor, a first user text message from a user of a plurality of users;

in response to receiving the first user text message, determining whether the user corresponds to a registered user;

in accordance with a determination that the user does not correspond to a registered user, storing user information associated with the user in a user database;

receiving, via the intercarrier message vendor, a second user text message from the user;

determining, based on a content of the second user text message, a user behavior associated with the user;

receiving, via a client user interface, a first client text message from a client;

receiving, from the client, a recipient preference;

determining, based on the user information from the user database and based further on the user behavior, whether the recipient preference is associated with the user;

modifying the first client text message to generate a second client text message;

in accordance with a determination that the recipient preference is associated with the user, presenting, via the intercarrier message vendor, the second client text message to the user;

in accordance with a determination that the second client text message is related to one or more users of the plurality of users, storing the second client text message in an event database via a user event processor;

in accordance with a determination that the second client text message is related to the client, storing the second client text message in the event database via a client event processor;

aggregating the second client text message and the first user text message to create a chat file;

storing the chat file in a chat database; and storing the second user text message in a message database, wherein:

modifying the first client text message to generate the second client text message comprises modifying the first client text message based on one or more of the user information and the user behavior, the chat database is separate from the message database, and the event database is separate from the message database and further separate from the chat database.

11. The method in accordance with claim 10, wherein the user information comprises demographic information associated with the user.

12. The method in accordance with claim 10, wherein determining the user behavior comprises determining a semantic meaning of second user text message.

13. The method in accordance with claim 10, wherein the method further comprises:

receiving a third user text message from a second user of the plurality of users; and identifying, based on the third user text message, a relationship between the user and the second user.

14. The method of claim 10, wherein presenting the second client text message to the user comprises presenting the second client text message to the user via a SMS service.

15. The method of claim 10, wherein presenting the second client text message to the user comprises presenting the second client text message to the user via a MMS service.

16. The method of claim 10, wherein the first user text message is addressed to the client via a long-code telephone number associated with the client.

17. The method of claim 16, wherein presenting the second client text message to the user comprises identifying the long-code telephone number to the user.

18. The method of claim 10, further comprising presenting the second user text message to the client.

* * * * *